United States Patent
Dejean et al.

(10) Patent No.: US 9,224,041 B2
(45) Date of Patent: Dec. 29, 2015

(54) TABLE OF CONTENTS EXTRACTION BASED ON TEXTUAL SIMILARITY AND FORMAL ASPECTS

(75) Inventors: Herve Dejean, Grenoble (FR); Jean-Luc Meunier, St. Nazaire les Eymes (FR)

(73) Assignee: XEROX CORPORATION, Norwalk, CT (US)

(*) Notice: Subject to any disclaimer, the term of this patent is extended or adjusted under 35 U.S.C. 154(b) by 2474 days.

(21) Appl. No.: 11/923,904

(22) Filed: Oct. 25, 2007

(65) Prior Publication Data

US 2009/0110268 A1    Apr. 30, 2009

(51) Int. Cl.
*G06F 17/27* (2006.01)
*G06K 9/00* (2006.01)

(52) U.S. Cl.
CPC ............ *G06K 9/00469* (2013.01); *G06F 17/27* (2013.01)

(58) Field of Classification Search
CPC ...................................................... G06F 17/27
USPC ........................................................ 715/227
See application file for complete search history.

(56) References Cited

U.S. PATENT DOCUMENTS

| | | | |
|---|---|---|---|
| 6,687,404 B1 | 2/2004 | Hull et al. | |
| 6,983,380 B2* | 1/2006 | Ko | 726/1 |
| 7,707,129 B2* | 4/2010 | Zhuang et al. | 706/20 |
| 2004/0003028 A1 | 1/2004 | Emmett et al. | |
| 2004/0024780 A1 | 2/2004 | Agnihotri et al. | |
| 2004/0205461 A1 | 10/2004 | Kaufman et al. | |
| 2004/0268236 A1 | 12/2004 | Chidlovskii et al. | |
| 2006/0155700 A1 | 7/2006 | Dejean et al. | |
| 2006/0155703 A1 | 7/2006 | Dejean et al. | |
| 2006/0156226 A1 | 7/2006 | Dejean et al. | |
| 2006/0248070 A1 | 11/2006 | Dejean et al. | |
| 2007/0196015 A1 | 8/2007 | Meunier et al. | |

FOREIGN PATENT DOCUMENTS

| | | |
|---|---|---|
| EP | 1679623 | 7/2006 |
| EP | 1826684 | 8/2007 |

OTHER PUBLICATIONS

Lin et al., "Detection and Analysis of Table of Contents Based on Content Association," Springer-Verlag, pp. 21, 2005.
Collins et al., "Unsupervised Models for Named Entity Classification," AT&T Labs-Research, pp. 100-110, at http://acl.ldc.upenn.edu/W/W99/W99-0613.pdf, (1999).
"Active Learning for Multi-Class Logistic Regression," International Conference on Machine Learning, pp. 8, at http://citeseer.ist.psu.edu/732620.html, (2005).

* cited by examiner

*Primary Examiner* — Kavita Padmanabhan
*Assistant Examiner* — Tionna Burke
(74) *Attorney, Agent, or Firm* — Fay Sharpe LLP

(57) ABSTRACT

An initial organizational table for a document is determined based on textual similarity between entries of the organizational table and target text fragments and not taking into account text formatting. A classifier is trained to identify text fragment pairs consisting of entries of the organizational table and corresponding target text fragments based at least in part on text formatting features. The training employs a training set of examples annotated based on the initial organizational table. The initial organizational table is updated using the trained classifier.

21 Claims, 2 Drawing Sheets

TABLE OF CONTENTS EXTRACTION BASED ON TEXTUAL SIMILARITY AND FORMAL ASPECTS

BACKGROUND

The following relates to the information processing arts. The following is described with illustrative reference to extraction of a table of contents, but will be useful in numerous other applications such as extraction of other organizational tables such as a table of figures, table of tables, or so forth.

The ability to identify a table of contents in a document has numerous uses. For example, table of contents identification can be used in conversion of an unstructured or shallowly structured document to a structured format stored in XML or another document formalism. In such applications, the identified table of contents provides a logical framework for structuring the document in accordance with chapters, sections, or other elements indexed in the table of contents. Identification of other organizational tables such as a table of figures or a table of tables (i.e., an organizational table listing informational tables of a document) can similarly be used in conversion to a structured format, or can be used to provide pinpoint citations to figures or tables in the document. Identification of a table of contents can also be used to identify major content categories for use in indexing or creation of a knowledge base.

In the process of analyzing an unstructured or shallowly structured document, it is known to convert the document to a text-based format (if it is not already in such a format) using optical character recognition (OCR), and to break the document in the text-based format into text fragments corresponding to sentences, physical lines of text, or other small textual groupings. The organizational table is expected to comprise organizational table entries in the form of a substantially contiguous group of text fragments, each of which is expected to be associable with a target text fragment somewhere in the document that exhibits some similarity with the corresponding organizational table entry.

In some formal approaches, the identification of target text fragments is based on formal considerations. For example, one may expect target text fragments such as chapter headings or section headings to be written in boldface, italics, or another distinctive font style, and/or in a larger font size than the surrounding text, or with a distinctive font effect such as underscoring, underscored, or otherwise highlighted using suitably distinctive text formatting. The particular distinctive text formatting used to highlight target text fragments generally differs from document to document—for example, one document may boldface chapter headings while another document may use all capital letters with no boldface for chapter headings, while yet another document may underscore chapter headings. Moreover, if the document contains more than one type of organizational table, the distinctive text formatting used for target text fragments associated with each organizational table may also differ. For example, the target text fragments for a table of figures typically corresponds to the figure captions, which may be highlighted using text formatting that is different from the text formatting used for chapter headings. As an example, the chapter headings may be boldfaced and underscored, while the figure captions may be italicized.

This demonstrates a significant problem with formal approaches, namely that the distinctive text formatting used to highlight target text fragments generally differs between documents for the same type of organizational table, and may differ within a document for different organizational tables.

A textual similarity based approach for identifying target text fragments has been developed, as disclosed for example in Dejean et al., U.S. Publ. Appl. No. 2006/0155703 A1 which published Jul. 13, 2006. In this approach the organizational table is selected as a contiguous sub-sequence satisfying the criteria that organizational table entries each have a link to a target text fragment having textual similarity with the organizational table entry, and in which no target text fragment lies within the organizational table and the target text fragments have an ascending ordering corresponding to an ascending ordering of the organizational table entries in the organizational table. Textual similarity relates to the content similarity of two text fragments, rather than the text formatting. Thus, for example, the text fragments:

Chapter 1—Introduction to Document Analysis
and
1. Introduction to Document Analysis.

have a high degree of textual similarity because both text fragments include the textual content "introduction to document analysis" and differ only in the early portion ("Chapter 1—" as compared with "1." in the latter case). However, these two text fragments have substantial text formatting dissimilarity since the former text fragment is italicized with no special capitalization while the latter fragment is not italicized but is underscored, written in all-caps, and indented respective to the left-hand margin of the page.

The approach of U.S. Publ. Appl. No. 2006/0155703 A1 employs textual similarity analysis, and hence is not affected by the variability of the distinctive text formatting employed in different documents and/or for different organizational table types of the same document. Moreover, the approach of U.S. Publ. Appl. No. 2006/0155703 A1 has been found to provide success rates of around 90% per document (that is, about 90% of the identified target text fragments are correct, and about 90% of the actual target text fragments are found).

However, it is desirable to still further enhance the success rate of organizational table identifications.

BRIEF DESCRIPTION

In some illustrative embodiments disclosed as illustrative examples herein, a method comprises: selecting organizational table entry/target text fragment pairs of an organizational table from text fragments of a document based on textual similarity; training a classifier to identify organizational table entry/target text fragment pairs of the organizational table using a training set having positive examples including at least some of the selected organizational table entry/target text fragment pairs and negative examples including at least some text fragment pairs of the document not selected as organizational table entry/target text fragment pairs, the classifier considering features including at least one text formatting feature; and reselecting organizational table entry/target text fragment pairs of the organizational table using the trained classifier.

In some illustrative embodiments disclosed as illustrative examples herein, an organizational table identifier comprises: a selector configured to select text fragment pairs associated with an organizational table from text fragments of a document based on textual similarity; a classifier trained to classify an input text fragment pair as associated with the organizational table or not associated with the organizational table based on one or more features of the text fragment pair including at least one text formatting feature, the classifier being trained using a set of positive training examples comprising some or all of the text fragment pairs selected by the selector; and a re-selector configured to reselect text fragment pairs associated with the organizational table from the text fragments of the document using the classifier.

In some illustrative embodiments disclosed as illustrative examples herein, a method comprises: determining an initial organizational table for a document based on textual similarity between entries of the organizational table and target text fragments and not taking into account text formatting; training a classifier to identify text fragment pairs consisting of entries of the organizational table and corresponding target text fragments based at least in part on text formatting features, the training employing a training set of examples annotated based on the initial organizational table; and updating the initial organizational table using the trained classifier.

DETAILED DESCRIPTION

Figure 1:
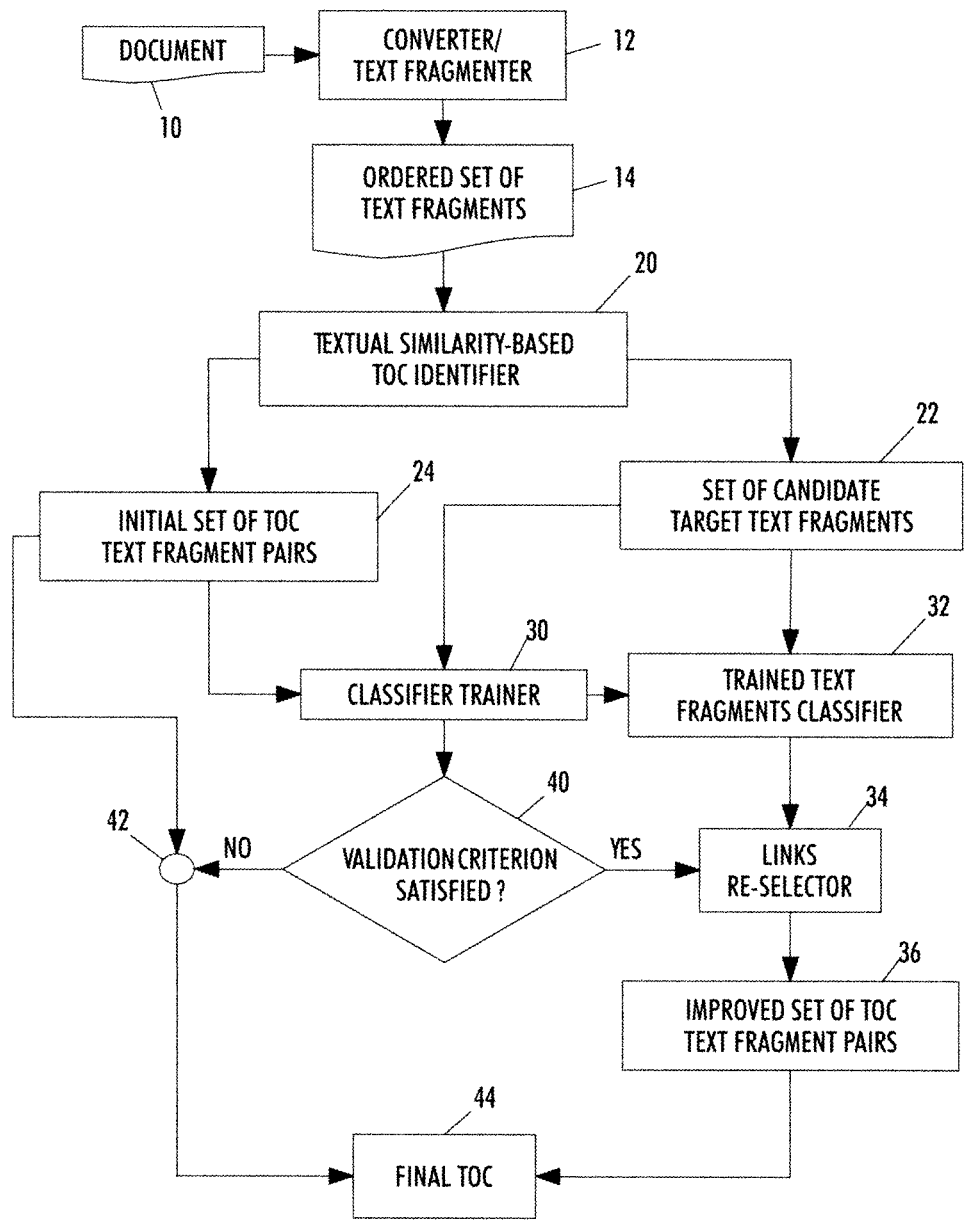
FIG. 1 diagrammatically shows a table of contents identifier.

With reference to FIG. 1, an illustrative table of contents identifier receives a document 10. A converter/text fragmenter 12 converts the document 10 into an ordered set of text fragments 14, if it is not already in such a format. For example, if the input document 10 is a hardcopy, then the converter/text fragmenter 12 may include an optical scanner for converting the hardcopy document into an image, an optical character recognition (OCR) engine for extracting textual characters from the image, and a text processor configured to break up the string of textual characters output by the OCR engine into text fragments such as sentences, physical lines of text, paragraphs, or so forth. Optionally, the ordered set of text fragments 14 may have a nested ordering, for example breaking the text into paragraph units each comprising one or more sentence units.

As will be described, the table of contents identifier of FIG. 1 makes use of one or more text formatting features. Some examples of text formatting features may include: font name; font size; font color; font style (e.g., boldface, italics); font effect (e.g., underscore, all-caps, small-caps); text fragment bounding box dimension (e.g., height or width); text fragment position on the page (e.g., indentation, vertical position relative to the top of the page); or so forth. The one or more text formatting features used by the table of contents identifier of FIG. 1 are suitably retained for each text fragment of the ordered set of text fragments 14, for example as text formatting annotations, as actual text formatting (in cases where the ordered set of text fragments 14 are stored as a rich text format or other format that inherently retains text formatting, as tags (in cases where the ordered set of text fragments 14 are stored in an XML format or other tagged format), or so forth.

A first pass textual similarity based table of contents identifier 20 receives the ordered set of text fragments 14 and identifies a set of table of contents entries and a set of candidate target text fragments 22, and selects target text fragments corresponding to the table of contents entries from the set of candidate target text fragments 22 so as to generate an initial set of table of contents text fragment pairs 24. The textual similarity based table of contents identifier 20 identifies the set of candidate target text fragments 22 as text fragments having textual similarity to one or more entries of the table of contents, and selects the target text fragments for the initial table of contents 24 from the set of candidate target text fragments 22 based on criterion such as ordering (taking into account the expectation that successive entries of the table of contents should be linked to target text fragments that have the same relative document order, i.e. successive table of content entries A, B, C, . . . should be linked to associated target text fragments A', B', C' . . . that are also successive in order in the document, albeit possibly with substantial numbers of text fragments in-between), and self-consistency (for example, the target text fragments should be outside of and after the table of contents in the document). The textual similarity based table of contents identifier 20 can identify the table of contents automatically, for example by identifying a contiguous set (or substantially contiguous set) of text fragments for which textually similar candidate target text fragments exist and which have few or no holes in the contiguity. Additionally or alternatively, the table of contents can be delineated manually, or by a combination of manual and automated processing (for example, a human identifies the pages containing the table of contents and automated identifications proceeds thereafter), or by using other analysis or criteria.

Some suitable embodiments of the textual similarity based table of contents identifier 20 are set forth in U.S. Publ. Appl. No. 2006/0155703 A1 which published on Jul. 13, 2006, and which is incorporated herein by reference in its entirety, and in U.S. Publ. Appl. No. 2007/0196015 A1 which published on Aug. 23, 2007, and which is incorporated herein by reference in its entirety. These are merely illustrative example embodiments. For example, in one embodiment disclosed in U.S. Publ. Appl. No. 2006/0155703 A1, a textual similarity based table of contents identification method includes selecting a table of contents as a contiguous sub-sequence of the ordered sequence of text fragments 14 satisfying the criteria: (i) entries defined by text fragments of the table of contents each have a link to a target text fragment having textual similarity with the entry; (ii) no target text fragment lies within the table of contents; and (iii) the target text fragments have an ascending ordering corresponding to an ascending ordering of the entries defining the target text fragments.

In some such embodiments, the selected table of contents includes holes defined by text entries of the selected table of contents that do not define entries—in such embodiments, the number of holes is typically substantially smaller than the number of entries, and the holes are not considered in evaluating criteria (i), (ii), and (iii).

In some such embodiments, the selecting of a table of contents includes: determining a plurality of textual similarity links associating pairs of text fragments, at least some text fragments being included in more than one link; determining a plurality of candidate tables of contents each defined by a contiguous sub-sequence of the ordered sequence of text fragments and each having at least one combination of links satisfying criteria (i), (ii), (iii); ranking each candidate table of contents based on the textual similarity links having source text fragments contained in the candidate table of contents; choosing the highest ranked candidate tables of contents as the table of contents; and optimizing the plurality of textual similarity links having source text fragments contained in the table of contents to select no more than a single link for each entry, the optimizing satisfying criteria (i), (ii), and (iii). The optimizing of the plurality of textual similarity links may in some embodiments employ a Viterbi shortest path algorithm to select optimized target text fragments that satisfy the criteria for ascending ordering and self-consistency. The determining of each of the plurality of candidate tables of contents may include: assigning a starting text fragment to the candidate table of contents; successively adding subsequent contiguous text fragments that satisfy the ordering criterion (iii) until a text fragment is reached that would violate the ordering criterion (iii); and performing a second pass through the candidate table of contents starting at the starting text fragment the second pass terminating the candidate table of contents just before a text fragment whose inclusion would violate the criterion (ii).

Each text fragment pair of the initial set of table of contents text fragment pairs includes a table of contents entry and a second, target text fragment having textual similarity with the table of contents entry. Most of these text fragment pairs can be expected to be correct. For example, in some embodiments and for some document corpora, the textual similarity based table of contents identifier 20 by itself provides the initial set of table of contents text fragment pairs 24 with an accuracy of about 90%. This is suitably achieved by the first-pass textual similarity based table of contents identifier 20 by taking into account textual similarity, i.e. common content of the table of contents entries and corresponding candidate target text fragments, without taking into account text formatting features of the text fragments. Hence, the obtained results 22, 24 are independent of text formatting.

Accordingly, it is recognized herein that the first-pass textual similarity based table of contents identifier 20 can be used to define a suitable set of training examples for training a classifier to distinguish correct table of content entry-target text fragment pairs from incorrect pairs. In particular, the initial set of text fragment pairs 24 and the set of candidate target text fragments 22 provide positive examples comprising the table of content entries/target text fragment pairs of the initial set of table of content text fragment pairs 24, and negative examples comprising the table of content entries coupled with candidate target text fragments that are not selected for inclusion in the initial set of table of contents text fragment pairs 24.

This set of training examples is specific to the table of contents of the document 10 under consideration. The table of content entries and target text fragments selected by the textual similarity-based first-pass identifier 20 generally have the textual formatting used for table of contents in that document, that is, generally employ the distinctive combination of font name, font size, font color, font style (e.g., boldface, italics), font effects (e.g., underscore, all-caps, small-caps), or so forth used in the specific document 10 to highlight table of content entries and target text fragments linked to the entries. The initially selected text fragment pairs generally have the correct text formatting not because the first pass identifier 20 takes into account text formatting—to the contrary, the first pass identifier employs a textual similarity analysis and ignores any text formatting information. Rather, the initially selected text fragment pairs have the correct text formatting because they are generally correctly identified by the first pass, and accordingly have the text formatting used in the document 10 for the table of content.

To improve upon the generally correct result 24 obtained by the first pass textual similarity-based table of contents identifier 20, a classifier trainer 30 trains a text fragments classifier 32 based on examples including some or all of the initial set of table of contents text fragments pairs 24 and some or all additional pairs obtained from the discarded candidate target text fragments. The text fragments pairs 24 selected in the first pass are annotated as positive examples, while the discarded entry/candidate target text fragment pairs are annotated as negative examples.

The text formatting features considered by the classifier may include, for example: font name, font size, font color, font style (e.g., boldface, italics), font effects (e.g., underscore, all-caps, small-caps), text fragment bounding box dimension (e.g., height or width), text fragment position on the page (e.g., indentation, vertical position relative to the top of the page), or so forth, or various combinations of these or other text formatting features. In some embodiments, the features may also include a textual similarity measure for the entry/candidate target text fragment pair retained from the processing of the first-pass textual similarity-based table of contents identifier. However, the textual similarity measure, if included, is used in conjunction with one or more textual formatting features so as to augment and improve upon the textual similarity analysis of the first pass identifier 20.

The binary classifier 32 can be substantially any type of binary classifier. The binary classifier 32 can employ hard classification (e.g., either "1" indicating the text fragment pair should be selected as part of the table of contents, or "0" indicating the text fragment pair should not be selected) or soft classification, for example outputting a probability in the range [0,1] where larger values indicate a higher likelihood that the text fragment pair belongs to the table of contents. Some illustrative examples of suitable text formatting features that may be suitably considered by the classifier 32 include: width or height of the text fragment bounding box, optionally normalized to the range [0,1]; a Boolean value indicating if all characters are uppercase; a Boolean value indicating if all characters are lowercase; a font size, optionally normalized to the range [0,1]; a font color specified as red, green, and blue coordinates, optionally each normalized to the range [0,1]; a font name optionally represented as a numerical value; a Boolean value indicating a font style, for example "1" corresponding to boldface or "0" corresponding to not boldface; a Boolean value indicating underscoring; and so forth. Such text formatting features can be considered for each text fragment pair respective to the table of contents entry, the candidate target text fragment, or both. For each input text fragment pair, a features vector or other multidimensional representation is suitably constructed in which each vector element or dimension corresponds to a feature. Optionally, one of the features vector elements may correspond to the textual similarity measure for the text fragment pair output by the first-pass identifier 20.

The classifier trainer 30 can apply substantially any type of training algorithm that comports with the selected binary classifier 32. In some embodiments a multi-class logistic regression algorithm is used. The training set can include the entire set of candidate target text fragments 22, or some sub-set. In some embodiments, the training set includes a set of positive examples comprising the entire initial set of text fragment pairs 24, and a set of negative examples comprising a randomly selected portion of the discarded candidate target text fragments of the set of candidate target text fragments 22 that were not selected as target text fragments in the first pass. The set of negative examples is in some embodiments selected to have a selected size ratio compared with the set of positive examples—for example, in some embodiments for every positive example two negative examples are chosen. It is also contemplated to include fewer than all of the text fragments pairs of the initial set of selected text fragment pairs 24 in the set of positive examples. Still further, it is contemplated to include in the set of negative examples text fragment pairs from the document 10 that were not candidates during the first pass.

The trained classifier 32 is expected to be highly accurate, because the trained classifier 32 takes into account the type or types of text formatting commonly used in documents to highlight or set off target text fragments, and because the training set is specifically tailored to the document 10 currently under consideration. A given document is usually consistent in its use of a particular text formatting to highlight table of content entries and corresponding target text fragments such as section headings. Similarly, the entry and target text fragments for other types of organizational tables, such as figure captions in the case of a table of figures, typically have a highly uniform and distinctive text formatting in most documents. It should be noted that different formatting may be used for the table entries and the corresponding target text fragments—this can be accounted for by a suitable selection of features considered by the classifier trainer 30. Because the training set was derived from the document 10 itself, using the generally accurate textual similarity-based table of contents identifier 20, the trainer 30 is likely to produce the trained classifier 32 configured to associate the particular text formatting used in the document 10 with correct text fragment pairs.

Accordingly, in most cases, it is advantageous to have a links reselector 34 use the trained classifier 32 to reselect the text fragment pairs, so as to generate an improved set of table of contents text fragment pairs 36 that is improved over the initial set of table of contents text fragment pairs 24.

However, in some cases the trained classifier 32 may produce results that are less satisfactory than those produced by the first pass identifier 20 acting alone. For example, if the document 10 does not utilize text formatting to highlight or set off the target text fragments, or if such text formatting is lost or corrupted by the converter/text fragmenter 12, then the trained classifier 32 is likely to produce unsatisfactory results. The improvement provided by the second (classifier-based) pass may also be degraded if the same text formatting is used for purposes other than to highlight table entries or corresponding target text fragments. For example, if italics are used both to highlight headings corresponding to table of contents entries, and also to highlight figure captions, then the trained classifier performance may be adversely affected. Because the first pass identifier 20 typically produces good results by itself, e.g., of order 90% accuracy for some embodiments and some document corpora, the performance bar is high for the trained classifier 32 to outperform the typically already good results first-pass identifier 32. However, if the table of contents produced by the textual similarity-based table of contents identifier 20 is not accurate enough, some of the target text fragments will correspond to incorrect textual fragments that may not share a common text formatting. This constitutes noise in the first pass result. In such a case in the second (classifier-based) pass the classifier trainer 30 may have difficulty discerning regularity in the formatting of the first-pass table of contents text fragment pairs due to the noise.

In view of such potential difficulties, in some embodiments an optional validator 40 performs validation of the trained classifier 32. The purpose of the optional validator 40 is to determine whether the trained classifier 32 is likely to improve upon the initial results 24. If the optional validator 40 indicates that improvement is likely (for instance the trained classifier 32 is able to largely reproduce the result of the first textual-based pass), then the links re-selector 34 uses the trained classifier 32 to re-select the text fragment pairs, so as to generate the improved set of table of contents text fragment pairs 36 that is improved over the initial set of table of contents text fragment pairs 24. On the other hand, if the optional validator 40 indicates that improvement is unlikely to be achieved using the trained classifier 32, then a decision 42 is made to retain the initial results 24. Thus, a final table of contents 44 is generated as either the initial set of table of contents text fragment pairs 24, or as the improved set of table of contents text fragment pairs 36, depending upon the output of the validator 40. In some embodiments, an N-fold validation process is employed, with N=3 in some embodiments, and the validation criterion is set to a 90% success rate in some such embodiments. More generally, the validation criterion is suitably selected such that if the validation criterion is satisfied then there is a substantial likelihood of achieving improvement in the identified table of contents by applying the links re-selector 34.

In performing the approach described with reference to FIG. 1, components of the first pass textual similarity table of contents identifier 20 are in some embodiments advantageously leveraged or reused during the second pass, so as to provide a more compact, efficient, and robust table of contents identifier.

Figure 2:
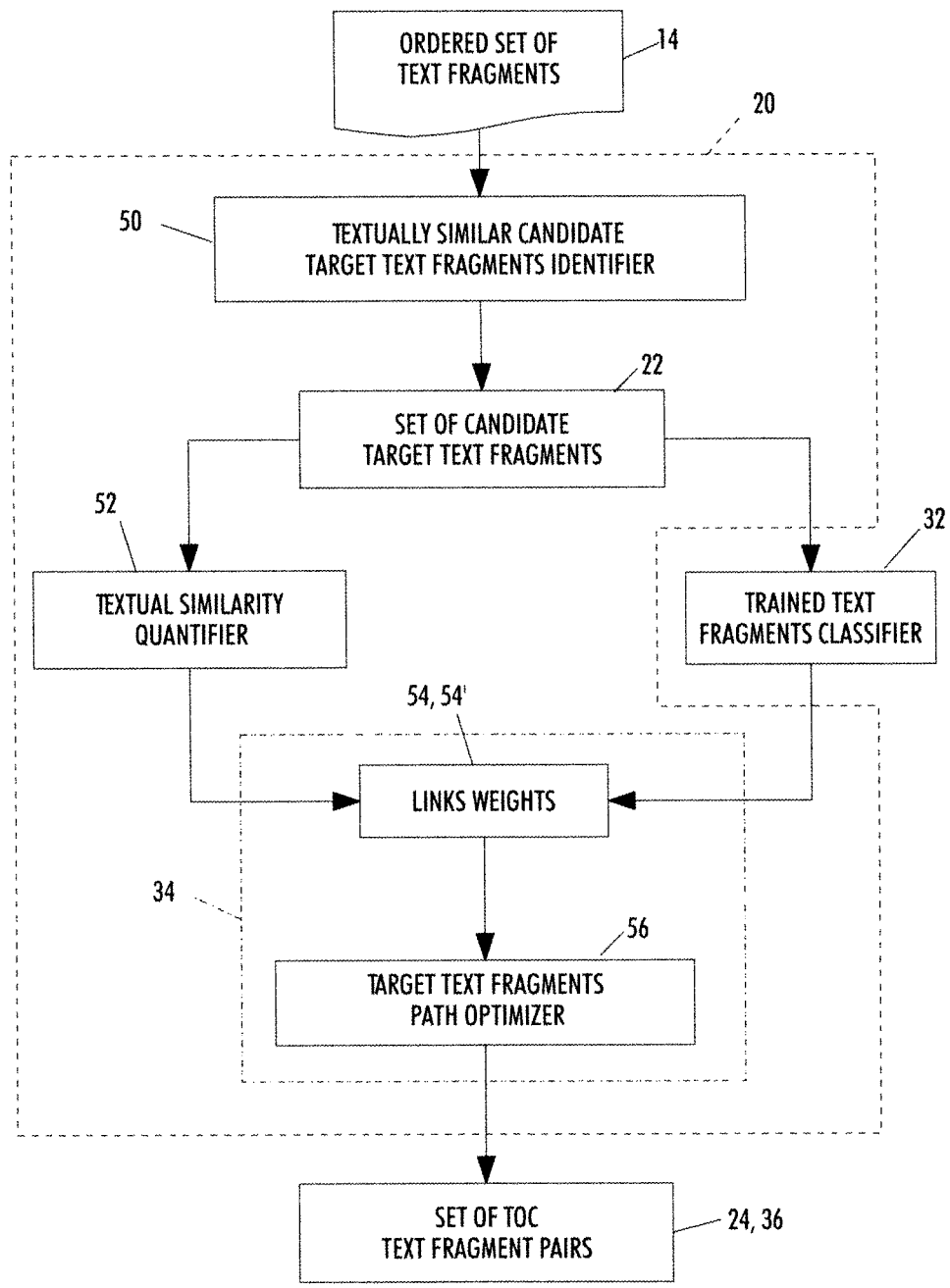
FIG. 2 diagrammatically shows an embodiment of the textual similarity based table of contents identifier and the links re-selector that integrates a portion of these two components.

For example, with reference to FIG. 2, an embodiment is illustrated as an example of integration of the first pass textual similarity table of contents identifier 20 and the second pass employing the classifier 32. In the illustrative embodiment of FIG. 2, the ordered set of text fragments 14 is first processed by the textual similarity table of contents identifier 20. This first entails processing by a textually similar candidate target text fragments identifier 50, which identifies the set of candidate target text fragments 22. Each table of contents entry has one or more associated candidate target text fragments drawn from the body of the document. A textual similarity quantifier 52 assigns a weights to each candidate target text fragment based on its textual similarity to the corresponding table entry, to generate a set of link weights 54. A target text fragments path optimizer 56 is applied to select target text fragments from the set of candidate target text fragments 22 while respecting the criteria of ordering (successive table entries should have a corresponding successive ordering of the associated target text fragments) and self-consistency (target text fragments should lie outside of, and typically after, the table of contents). In some embodiments, such as those described in U.S. Publ. Appl. No. 2006/0155703 A1, the target text fragments path optimizer 56 employs a Viterbi shortest path optimization algorithm. The output of the target text fragments path optimizer 56 in the first pass is the initial set of table of contents text fragment pairs 24.

With continuing reference to FIG. 2, in the second pass the trained text fragments classifier 32 is used to assign link weights 54' to the candidate target text fragments. In FIG. 2, the primed reference number 54' denotes the typically different weights assigned by the classifier 32, as compared with the textual similarity-based weights 54 assigned by the textual similarity quantifier 52 of the textual similarity table of contents identifier 20. Advantageously, the links re-selector 36 can operate by inputting the updated weights 54' to the same target text fragments path optimizer 56 as was included in the textual similarity table of contents identifier 20. The second pass of the path optimizer 56 using the updated weights 54' yields the improved set of table of contents text fragment pairs 36. Although not illustrated in FIG. 2, if the features vector is selected to include a textual similarity measure, then the textual similarity quantifier 52 (or the results generated by the quantifier 52 during the first pass) can be forwarded to the classifier trainer 30 and the classifier 32, so as to further promote reuse and integration of the first and second passes.

The approach substantially as described in FIGS. 1 and 2 has been implemented using document corpora of close to 36,000 pages and including about 3800 table of contents entries. Table of contents identification was performed using the first pass (similarity analysis) alone, and also using the first pass followed by the second pass (using the classifier to reselect the links). The success rate using the first pass alone was in the low 90% range for these tests, and inclusion of the second pass provided a gain of about 2% in the F1 measure. Since the second pass typically takes about 1% of the total processing time, this is a substantial improvement in view of the small computational increase.

The described usage of the trained classifier 32 to improve the table of contents is an illustrative example. The trained classifier 32 can be used in other ways to improve the final table of contents. For example, the trained classifier 32 can be used as a binary filter to remove those candidate target text fragments that are indicated by the trained classifier 32 to not be target text fragments. After such filtering, the path optimizer can be re-run using the filtered set of candidate target text fragments to provide a potentially improved result.

FIGS. 1 and 2 have been described with illustrative reference to tables of contents. However, the described approaches are readily applied to substantially any type of organizational table, such as a table of figures, a table of tables, or so forth. Moreover, the described approaches can be applied to the same document to extract different organizational tables, taking advantage of the typically different text formatting used for the target links of each different organizational table type.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method comprising:
    selecting organizational table entry/target text fragment pairs of an organizational table from text fragments of a same document based on textual similarity, each pair of text fragments comprising a text fragment of an organizational table entry and a candidate target text fragment of the same document;
    training a classifier to identify organizational table entry/target text fragment pairs of the organizational table using a training set having positive examples including at least some of the selected organizational table entry/target text fragment pairs and negative examples including at least some text fragment pairs of the document not selected as organizational table entry/target text fragment pairs, the classifier considering features including at least one text formatting feature; and
    reselecting organizational table entry/target text fragment pairs of the organizational table of the document using the trained classifier.

2. The method as set forth in claim 1, wherein the selecting comprises:
    identifying a set of candidate target text fragments from the document based on textual similarity with organizational table entries; and
    choosing target text fragments from the set of candidate target text fragments based on a plurality of criteria.

3. The method as set forth in claim 2, wherein the criteria include at least an ordering criterion and a self-consistency criterion.

4. The method as set forth in claim 2, further comprising: validating the trained classifier respective to its ability to distinguish positive training examples and negative training examples, the reselecting being performed conditional upon a result of the validating.

5. The method as set forth in claim 1, further comprising: determining effectiveness of the trained classifier using the training set, the reselecting being performed conditional upon the determined effectiveness satisfying an effectiveness criterion.

6. The method as set forth in claim 1, further comprising: performing the selecting based at least in part on a contiguity criterion specifying that the organizational table entries be substantially contiguous while allowing for up to a threshold number of holes.

7. The method as set forth in claim 1, wherein the classifier considers at least one text formatting feature selected from the group consisting of font name, font size, font color, font style, font effect, text fragment bounding box dimension, and text fragment position on the page.

8. The method as set forth in claim 1, wherein the classifier considers features including a text similarity measure and at least one text formatting feature.

9. An organizational table identifier comprising:
    a selector comprising computer hardware configured to select text fragment pairs associated with an organizational table from text fragments of a document based on textual similarity;
    a classifier comprising computer hardware wherein the classifier is trained to classify an input text fragment pair as associated with the organizational table or not associated with the organizational table based on one or more features of the text fragment pair including at least one text formatting feature, the classifier being trained using a set of positive training examples comprising some or all of the text fragment pairs of the document selected by the selector; and
    a re-selector comprising computer hardware configured to reselect text fragment pairs associated with the organizational table of the document from the text fragments of the document using the classifier.

10. The organizational table identifier as set forth in claim 9, wherein the selector weights text fragment pairs based on textual similarity, and the selector further comprises:
    a path optimizer comprising computer hardware configured to select text fragment pairs so as to optimize an ordered path respective to the weights of the text fragment pairs.

11. The organizational table identifier as set forth in claim 10, wherein the links re-selector re-applies the path optimizer but with weights assigned at least in part by the classifier.

12. The organizational table identifier as set forth in claim 10, wherein the path optimizer implements a Viterbi shortest path optimization algorithm.

13. The organizational table identifier as set forth in claim 9, wherein the one or more features include at least one text formatting feature selected from a group of text formatting features consisting of font name, font size, font color, font style, font effect, bounding box dimension, and position on the page.

14. The organizational table identifier as set forth in claim 9, wherein the one or more features include textual similarity of the text fragments of the input text fragment pair.

15. The organizational table identifier as set forth in claim 9, wherein the classifier is trained using the set of positive training examples comprising some or all of the text fragment pairs selected by the selector and a set of negative training examples comprising some or all of the text fragment pairs of the document other than the text fragment pairs selected by the selector.

16. The organizational table identifier as set forth in claim 15, further comprising:
a validator comprising computer hardware configured to validate the trained classifier respective to its ability to distinguish between the positive and negative examples, the re-selector being applied conditional upon a result of the validating.

17. A method comprising:
determining an initial organizational table for a document based on textual similarity between entries of the organizational table and target text fragments of the document, and not taking into account text formatting;
training a classifier to identify text fragment pairs consisting of entries of the organizational table and corresponding target text fragments of the document based at least in part on text formatting features, the training employing a training set of examples annotated based on the initial organizational table of the document; and
updating the initial organizational table of the document using the trained classifier.

18. The method as set forth in claim 17, wherein the classifier is configured to classify an input text fragment pair based at least in part on a text formatting feature of one or both text fragments of the input text fragment pair selected from a group of text formatting features consisting of font name, font size, font color, font style, font effect, bounding box dimension, and position on the page.

19. The method as set forth in claim 17, wherein the classifier is configured to classify an input text fragment pair based on (i) textual similarity between the text fragments of the input text fragment pair and (ii) at least one text formatting feature of one or both text fragments of the input text fragment pair.

20. The method as set forth in claim 17, further comprising:
validating the trained classifier respective to its effectiveness in identifying text fragment pairs consisting of entries of the organizational table and corresponding target text fragments, the updating being performed conditional upon the validating.

21. The method as set forth in claim 1, further comprising:
the negative examples including discarded entry/candidate target text fragment pairs of the document.

* * * * *